(12) United States Patent
Geissler et al.

(10) Patent No.: US 8,500,290 B2
(45) Date of Patent: Aug. 6, 2013

(54) PROJECTION SYSTEM

(75) Inventors: Enrico Geissler, Jena (DE); Christoph Nieten, Jena (DE); Guenter Rudolph, Jena (DE); Marco Pretorius, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 181 days.

(21) Appl. No.: 13/001,377

(22) PCT Filed: Jun. 23, 2009

(86) PCT No.: PCT/EP2009/004531
§ 371 (c)(1),
(2), (4) Date: Mar. 31, 2011

(87) PCT Pub. No.: WO2009/156130
PCT Pub. Date: Dec. 30, 2009

(65) Prior Publication Data
US 2011/0176120 A1    Jul. 21, 2011

Related U.S. Application Data

(60) Provisional application No. 61/075,133, filed on Jun. 24, 2008.

(30) Foreign Application Priority Data

Jun. 24, 2008  (DE) .......................... 10 2008 029 785
Jun. 24, 2008  (DE) .......................... 10 2008 029 787
Jun. 24, 2008  (DE) .......................... 10 2008 029 788
Jun. 24, 2008  (DE) .......................... 10 2008 029 789

(51) Int. Cl.
*G03B 21/28* (2006.01)

(52) U.S. Cl.
USPC ................... 353/99; 353/30; 353/31; 353/37; 353/38; 353/81; 353/84; 353/88; 353/98; 349/8; 359/242; 359/243

(58) Field of Classification Search
USPC ................. 353/30, 31, 33, 37, 38, 81, 84, 88, 353/98, 99; 359/237, 242, 243, 245, 385, 359/433, 434, 651, 655, 664, 471, 631, 359/708–719; 348/742, 743, 750, 756, 771; 349/5, 7–9
See application file for complete search history.

(56) References Cited

U.S. PATENT DOCUMENTS 4,330,282 A    5/1982   Nash
5,075,789 A    12/1991  Jones et al.
(Continued)

FOREIGN PATENT DOCUMENTS

DE    197 23 208 A1    12/1998
DE    101 40 806 A1    3/2003
(Continued)

OTHER PUBLICATIONS

Hornbeck, Larry J., "Digital Light Processing for High-Brightness, High-Resolution Applications," Texas Instruments Digital Video Products Group, Texas Instruments 1997, pp. 1-14.
(Continued)

*Primary Examiner* — Georgia Y Epps
*Assistant Examiner* — Sultan Chowdhury
(74) *Attorney, Agent, or Firm* — Patterson Thuente Pedersen, P.A.

(57) ABSTRACT

A projection system having a first tilting mirror matrix, a second tilting mirror matrix, and an imaging lens, which projects the first tilting mirror matrix onto the second tilting mirror matrix, wherein each tilting mirror matrix has multiple tilting mirrors, the tilting axes of which are positioned in a modulator surface plane. The imaging lens includes a first lens and an imaging mirror, and the imaging mirror forms an aperture stop of the imaging lens, wherein the aperture diaphragm includes an uneven angle of 90° together with the normal of the modulator surface of the first tilting mirror matrix without taking into account any optical path folds.

16 Claims, 7 Drawing Sheets

U.S. PATENT DOCUMENTS

| | | | |
|---|---|---|---|
| 5,079,544 A | 1/1992 | DeMond et al. | |
| 5,175,637 A | 12/1992 | Jones et al. | |
| 5,192,946 A | 3/1993 | Thompson et al. | |
| 5,214,420 A | 5/1993 | Thompson et al. | |
| 5,231,388 A | 7/1993 | Stoltz | |
| 5,280,277 A | 1/1994 | Hornbeck | |
| 5,287,096 A | 2/1994 | Thompson et al. | |
| 5,384,659 A * | 1/1995 | Shikama et al. | 359/719 |
| 5,392,869 A | 2/1995 | Fröschl et al. | |
| 5,481,321 A | 1/1996 | Lipton | |
| 5,559,629 A | 9/1996 | Sheets et al. | |
| 5,978,142 A | 11/1999 | Blackham et al. | |
| 6,643,069 B2 | 11/2003 | Dewald | |
| 6,776,492 B1 | 8/2004 | Chang | |
| 6,817,717 B2 | 11/2004 | Childers et al. | |
| 6,817,719 B2 * | 11/2004 | Rudolph et al. | 353/37 |
| 6,850,352 B1 | 2/2005 | Childers | |
| 6,891,672 B2 | 5/2005 | Whitehead et al. | |
| 6,940,645 B2 * | 9/2005 | Liang et al. | 359/462 |
| 6,985,272 B2 | 1/2006 | Bridgwater et al. | |
| 7,002,533 B2 | 2/2006 | Sayag | |
| 7,018,046 B2 | 3/2006 | Childers et al. | |
| 7,050,122 B2 | 5/2006 | Gibbon et al. | |
| 7,064,740 B2 | 6/2006 | Daly | |
| 7,090,353 B1 | 8/2006 | Bay | |
| 7,092,137 B2 | 8/2006 | Childers | |
| 7,106,505 B2 | 9/2006 | Whitehead et al. | |
| 7,136,205 B1 | 11/2006 | Kaye | |
| 7,136,209 B2 | 11/2006 | Lerner et al. | |
| 7,136,210 B2 | 11/2006 | Harper | |
| 7,172,297 B2 | 2/2007 | Whitehead et al. | |
| 7,175,279 B2 | 2/2007 | Drazic et al. | |
| 7,175,289 B2 | 2/2007 | Lerner et al. | |
| 7,213,922 B2 | 5/2007 | Suzuki et al. | |
| 7,224,335 B2 | 5/2007 | Gibbon et al. | |
| 7,224,411 B2 | 5/2007 | Gibbon et al. | |
| 7,370,979 B2 | 5/2008 | Whitehead et al. | |
| 7,394,597 B2 * | 7/2008 | Penn | 359/629 |
| 7,431,460 B2 | 10/2008 | Hall, Jr. et al. | |
| 7,494,225 B2 * | 2/2009 | Akiyama | 353/33 |
| 7,503,659 B2 * | 3/2009 | Conner | 353/94 |
| 7,517,095 B2 | 4/2009 | Coates et al. | |
| 7,621,641 B1 * | 11/2009 | Silverstein et al. | 353/20 |
| 7,663,795 B2 | 2/2010 | Blackham | |
| 7,777,945 B2 | 8/2010 | Whitehead et al. | |
| 8,226,246 B2 * | 7/2012 | Shirai et al. | 353/99 |
| 2002/0085181 A1 * | 7/2002 | Davis et al. | 353/98 |
| 2003/0016335 A1 | 1/2003 | Penn | |
| 2003/0123162 A1 | 7/2003 | Penn | |
| 2004/0001184 A1 | 1/2004 | Gibbons et al. | |
| 2004/0169823 A1 | 9/2004 | Bridgwater et al. | |
| 2004/0207769 A1 | 10/2004 | Lin et al. | |
| 2005/0168699 A1 | 8/2005 | Suzuki et al. | |
| 2006/0055897 A1 | 3/2006 | Lerner et al. | |
| 2006/0087712 A1 | 4/2006 | Harper | |
| 2006/0114416 A1 | 6/2006 | O'Donnell et al. | |
| 2006/0158619 A1 | 7/2006 | Hall Jr. et al. | |
| 2006/0203202 A1 | 9/2006 | Uchiyama et al. | |
| 2006/0244921 A1 | 11/2006 | Childers | |
| 2007/0076172 A1 | 4/2007 | Lerner et al. | |
| 2007/0103768 A1 | 5/2007 | Blackham | |
| 2007/0109507 A1 | 5/2007 | Ishikura et al. | |
| 2007/0126996 A1 * | 6/2007 | Coates et al. | 353/98 |
| 2007/0177107 A1 * | 8/2007 | Piehler | 353/33 |
| 2007/0216872 A1 | 9/2007 | Hall, Jr. | |
| 2007/0229718 A1 | 10/2007 | Hall, Jr. | |
| 2008/0007699 A1 * | 1/2008 | Pettitt et al. | 353/84 |
| 2009/0225236 A1 | 9/2009 | Yoon | |
| 2011/0175926 A1 | 7/2011 | Geissler | |
| 2011/0175953 A1 | 7/2011 | Geissler | |
| 2011/0176120 A1 | 7/2011 | Geissler et al. | |

FOREIGN PATENT DOCUMENTS

| | | |
|---|---|---|
| EP | 1 269 756 B1 | 5/2004 |
| EP | 1 549 056 A2 | 6/2005 |
| FR | 2 899 980 A1 | 10/2007 |
| WO | WO 98/56186 | 12/1998 |
| WO | WO 2004/102973 A1 | 11/2004 |
| WO | WO 2008/068257 A1 | 6/2008 |

OTHER PUBLICATIONS

Bleha, W.P., et al., "Image Light Amplifier (ILA) Technology for Large-Screen Projection," *SMPTE Journal*, Oct. 1997, pp. 710-717.

* cited by examiner

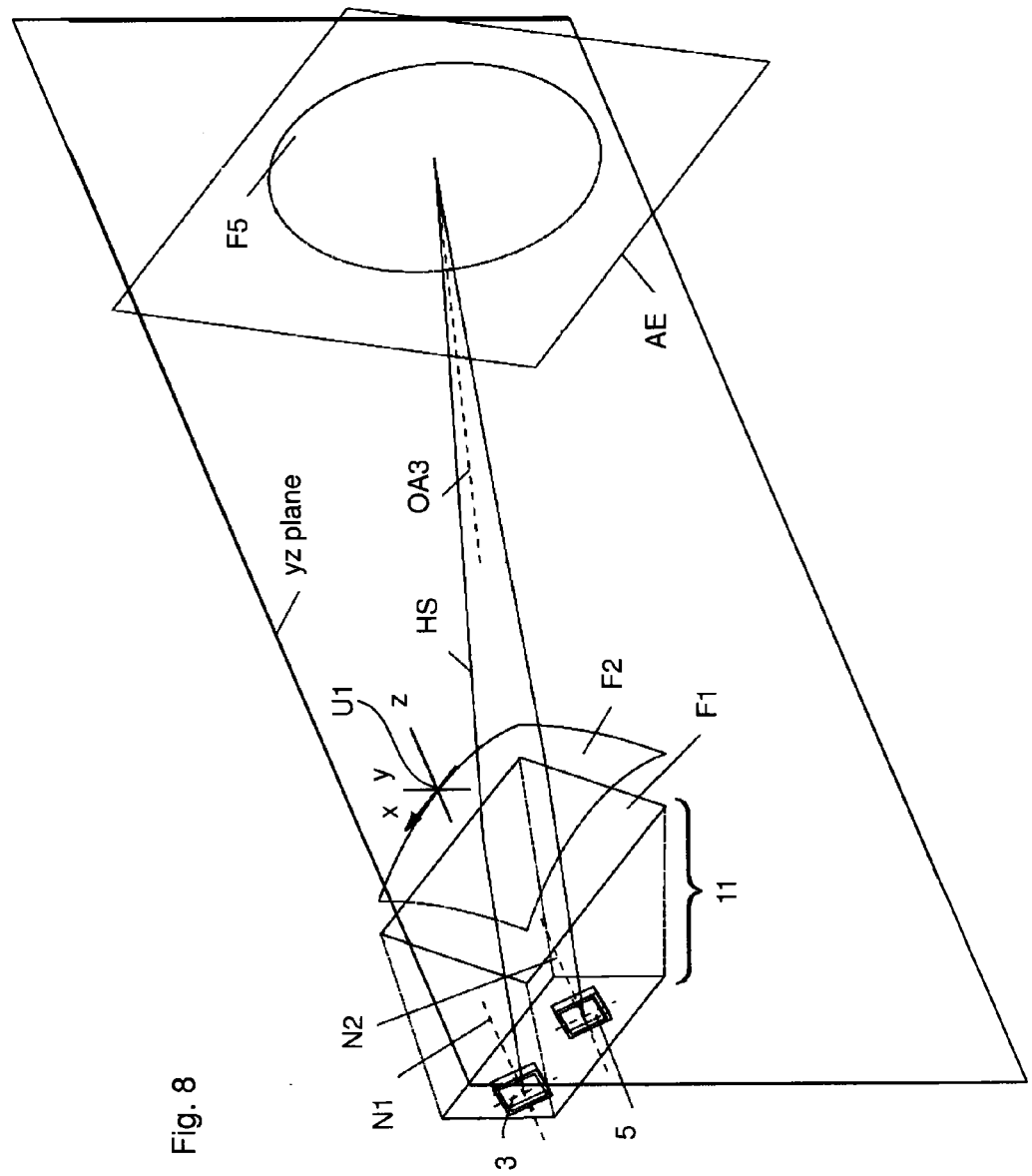

PROJECTION SYSTEM

PRIORITY CLAIM

The present application is a National Phase entry of PCT Application No. PCT/EP2009/004531, filed Jun. 23, 2009, which claims priority from German Patent Application Number 102008029785.2, filed Jun. 24, 2008, German Patent Application Number 102008029787.9, filed Jun. 24, 2008, German Patent Application Number 102008029788.7, filed Jun. 24, 2008, German Patent Application Number 102008029789.5, filed Jun. 24, 2008, and U.S. Provisional Application No. 61/075,133, filed Jun. 24, 2008, the disclosures of which are hereby incorporated by reference herein in their entirety.

FIELD OF THE INVENTION

The present invention relates to a projection system including a first tilting mirror matrix, a second tilting mirror matrix, imaging optics that image the first tilting mirror matrix onto the second tilting mirror matrix; wherein each tilting mirror matrix includes a plurality of tilting mirrors, each tilting mirror having a tilting axis which lies in a modulator surface plane. Such a projection system is known for example from EP 1 269 756.

BACKGROUND

With such a projection system, the advantage that the black level in the projected image (thus the residual brightness of a per se black image spot) can be clearly reduced compared with projection systems with only a single tilting mirror matrix is achieved through the optical series connection of two tilting mirror matrices.

However, it is very difficult to image the first tilting mirror matrix onto the second tilting mirror matrix by means of the imaging optics in high quality. In particular this is because, with tilting mirror matrices, the beam bundle of the reflected light used to generate images runs, not perpendicular to the modulator surface, but at an angle predetermined by the tilting position of the tilting mirror. A compact optical structure is also made difficult by this.

SUMMARY OF THE INVENTION

Starting from here, the object of the invention is to develop the projection system of the type named at the beginning such that a compact optical structure can be realized with simultaneously good imaging quality.

The object is achieved in the case of the projection system of the type named at the beginning in that the imaging optics includes a first lens as well as an imaging mirror and in that the imaging mirror forms an aperture stop of the imaging optics, wherein the aperture stop forms an angle other than 90° with the normal of the modulator surface of the first tilting mirror matrix without possible folding of the beam path.

Through the tilted arrangement of the aperture stop, the imaging optics can be designed such that the imaging errors can be minimized.

By foldings of the beam path are meant here all foldings of the beam path which do not have an imaging property. These are thus foldings of the beam path on level surfaces. These serve to increase the compactness of the device, but have no influence on the imaging quality of the imaging optics, with the result that the tilting of the aperture stop is related to the modulator surface without any foldings of the beam path.

The imaging mirror can be designed in particular as a lens metallized on the back.

The tilting mirrors of the two tilting mirror matrices can in particular be switched or brought into a first and a second tilting position.

A projection system A1 with a first tilting mirror matrix, a second tilting mirror matrix and imaging optics which image the first tilting mirror matrix onto the second tilting mirror matrix is furthermore provided, wherein every tilting mirror matrix has several tilting mirrors each having a tilting axis and wherein the tilting axes lie in a modulator surface, the modulator surface of the first tilting mirror matrix is arranged in a modulator plane and the modulator surface of the second tilting mirror matrix is arranged in the modulator plane or a plane parallel to it and a deflecting optics is arranged between the tilting mirror matrices on the one hand and the imaging optics on the other hand, said deflecting optics folds the beam path at least once between the imaging optics and the respective tilting mirror matrix.

Developments of the projection system A1, which is also called projection system according to version A1, are given below.

A2. Projection system according to version A1, in which the deflecting optics brings about the at least one folding of the beam path between the first tilting mirror matrix and the imaging optics by total internal reflection.

A3. Projection system according to version A1 or A2, in which the deflecting lens system brings about the at least one bending of the beam path between the second tilting mirror matrix and the imaging optics by total internal reflection.

A4. Projection system according to one of versions A1-A3, in which the deflecting optics folds the beam path between the imaging optics and each tilting mirror matrix twice in each case.

A5. Projection system according to one of versions A1-A4, in which the deflecting optics is designed symmetrical to a centre plane perpendicular to the modulator plane.

A6. Projection system according to version A5, in which the modulator surfaces of the tilting mirror matrices (3, 5) are arranged symmetrical to the centre plane.

A7. Projection system according to version A5 or A6, in which the imaging optics are designed symmetrical to the centre plane.

A8. Projection system according to one of versions A1-A7, in which the imaging optics comprise a first lens which is designed as a plano-convex lens and a second lens which is designed as a lens metallized on the back, wherein the flat side of the first lens is cemented to the deflecting optics.

A9. Projection system according to version A8, in which the convex side of the first lens is designed as an aspherical surface (F2).

A10. Projection system according to version A9, in which the aspherical surface is tilted relative to the flat side of the first lens.

A11. Projection system according to one of versions A1-A10, in which the imaging optics have an aperture stop which forms an angle other than 90° with the normal of the modulator surface of the first tilting mirror matrix without possible foldings of the beam path.

A12. Projection system according to version A11, in which the aperture stop is arranged offset to the normal passing through the centre of the modulator surface of the first tilting mirror matrix without possible foldings of the beam path.

A13. Projection system according to version A11 or A12, in which the imaging optics comprise a first lens which is designed as a plano-convex lens and a second lens which is designed as a lens metallized on the back, wherein the convex side of the first lens forms an angle other than 90° with the normal of the modulator surface of the first tilting mirror matrix without possible foldings of the beam path.

A14. Projection system according to version A13, in which the metallized back of the second lens forms the aperture stop.

A15. Projection system according to one of versions A1-A14, in which the tilting mirrors can in each case be switched into a first and a second tilting position, in which an illumination module is provided which illuminates the first tilting mirror matrix with light such that the light strikes perpendicular to the modulator surface of the first tilting mirror matrix, and in which the imaging optics image the light reflected by the tilting mirrors of the first tilting mirror matrix which are in the first tilting position onto the second tilting mirror matrix at such an angle that the light reflected by the tilting mirrors of the second tilting mirror matrix which are in the first tilting position runs perpendicular to the modulator surface of the second tilting mirror matrix.

A projection system A16 with a first tilting mirror matrix, a second tilting mirror matrix and imaging optics is furthermore provided, in which the imaging optics comprise a first lens which is designed as a plano-convex lens and a second lens which is designed as a lens metallized on the back, wherein the convex side of the first lens is designed as an aspherical surface which has precisely one plane of mirror symmetry and is tilted relative to the flat side of the first lens.

The imaging optics preferably image the first tilting mirror matrix onto the second tilting mirror matrix.

Developments of the projection system A16, which is also called projection system according to version A16, are given below.

A17. Projection system according to version A16, in which every tilting mirror matrix has several tilting mirrors each the tilting axes of which lie in a modulator surface, wherein the modulator surfaces of the two tilting mirror matrices are arranged symmetrical to the plane of mirror symmetry.

A18. Projection system according to version A16 or A17, in which the imaging optics are designed symmetrical to the plane of mirror symmetry.

A19. Projection system according to one of versions A16-A18, in which both lenses of the imaging optics are made from the same material.

A20. Projection system according to one of versions A16-A19, in which every tilting mirror matrix has several tilting mirrors each the tilting axes of which lie in a modulator surface, and in which the imaging optics have an aperture stop which forms an angle other than 90° with the normal of the modulator surface of the first tilting mirror matrix without possible foldings of the beam path.

A21. Projection system according to version A20, in which the aperture stop is arranged offset to the normal passing through the centre of the modulator surface of the first tilting mirror matrix without possible foldings of the beam path.

A22. Projection system according to version A20 or A21, in which the convex side of the first lens forms an angle other than 90° with the normal of the modulator surface of the first tilting mirror matrix without possible foldings of the beam path.

A23. Projection system according to claim A22, in which the metallized back of the second lens forms the aperture stop.

A24. Projection system according to one of versions A20-A23, in which the modulator surface of the first tilting mirror matrix is arranged in a modulator plane and the modulator surface of the second tilting mirror matrix is arranged in the modulator plane or a plane parallel to it, and in which a deflecting optics is arranged between the tilting mirror matrices on the one hand and the imaging optics on the other hand, said deflecting optics folds the beam path at least once between the imaging optics and the respective tilting mirror matrix.

A25. Projection system according to version A24, in which the deflecting optics brings about the at least one folding of the beam path between the first tilting mirror matrix and the imaging optics by total internal reflection.

A26. Projection system according to version A24 or A25, in which the deflecting optics brings about the at least one folding of the beam path between the second tilting mirror matrix and the imaging optics by total internal reflection.

A27. Projection system according to one of versions A24-A26, in which the deflecting optics folds the beam path between the imaging optics and each tilting mirror matrix twice in each case.

A28. Projection system according to one of versions A24-A27, in which the deflecting optics is designed symmetrical to a centre plane perpendicular to the modulator plane.

A29. Projection system according to version A28, in which the modulator surfaces of the tilting mirror matrices are arranged symmetrical to the centre plane.

A30. Projection system according to version A28 or A29, in which the imaging optics are designed symmetrical to the centre plane.

A31. Projection system according to one of versions A24-A30, in which the flat side of the first lens is cemented to the deflecting optics.

A32. Projection system according to one of versions A16-A31, in which the tilting mirrors can in each case be switched into a first and a second tilting position, in which an illumination module is provided which illuminates the first tilting mirror matrix with light such that the light strikes perpendicular to the modulator surface of the first tilting mirror matrix, and in which the imaging optics image the light reflected by the tilting mirrors of the first tilting mirror matrix which are in the first tilting position onto the second tilting mirror matrix at such an angle that the light reflected by the tilting mirrors of the second tilting mirror matrix which are in the first tilting position runs perpendicular to the modulator surface of the second tilting mirror matrix.

A projection system A33 with a first tilting mirror matrix, a second tilting mirror matrix and imaging optics which image the first tilting mirror matrix onto the second tilting mirror matrix, wherein every tilting mirror matrix has several tilting mirrors each the tilting axes of which lie in a modulator surface and which can in each case be switched into a first and a second tilting position is furthermore provided, wherein the projection system A33 has an illumination module which illuminates the first tilting mirror matrix with light such that the light strikes perpendicular to the modulator surface of the first tilting mirror matrix, and wherein the imaging optics image the light reflected by the tilting mirrors of the first tilting mirror matrix which are in the first tilting position onto the second tilting mirror matrix at such an angle that the light reflected by the tilting mirrors of the second tilting mirror matrix which are in the first tilting position runs perpendicular to the modulator surface of the second tilting mirror matrix.

Developments of the projection system A33 which is also called projection system according to version A33 are given below.

A34. Projection system according to version A33, in which the modulator surface of the first tilting mirror matrix is arranged in a modulator plane and the modulator surface of the second tilting mirror matrix is arranged in the modulator plane or a plane parallel to it, and in which a deflecting optics is arranged between the tilting mirror matrices on the one hand and the imaging optics on the other hand, said deflecting optics folds the beam path between the imaging optics and the respective tilting mirror matrix at least once.

A35. Projection system according to version A34, in which the deflecting optics brings about the at least one folding of the beam path between the first tilting mirror matrix and the imaging optics by total internal reflection.

A36. Projection system according to version A34 or A35, in which the deflecting optics brings about the at least one folding of the beam path between the second tilting mirror matrix and the imaging optics by total internal reflection.

A37. Projection system according to one of versions A34-A36, in which the deflecting optics folds the beam path between the imaging optics and each tilting mirror matrix twice in each case.

A38. Projection system according to one of versions A34-A37, in which the deflecting optics is designed symmetrical to a centre plane perpendicular to the modulator plane.

A39. Projection system according to version A38, in which the modulator surface of the tilting mirror matrices are arranged symmetrical to the centre plane.

A40. Projection system according to version A38 or A39, in which the imaging optics are designed symmetrical to the centre plane.

A41. Projection system according to one of versions A33-A40, in which the imaging optics comprise a first lens which is designed as a plano-convex lens and a second lens which is designed as a lens metallized on the back, wherein the flat side of the first lens is cemented to the deflecting optics.

A42. Projection system according to version A41, in which the convex side of the first lens is designed as an aspherical surface.

A43. Projection system according to version A42, in which the aspherical surface is tilted relative to the flat side of the first lens.

A44. Projection system according to one of versions A33-A43, in which the imaging optics have an aperture stop which forms an angle other than 90° with the normal of the modulator surface of the first tilting mirror matrix without possible foldings of the beam path.

A45. Projection system according to version A44, in which the aperture stop is arranged offset to the normal passing through the centre of the modulator surface of the first tilting mirror matrix without possible foldings of the beam path.

A46. Projection system according to version A44 or A45, in which the imaging optics comprise a first lens which is designed as a plano-convex lens and a second lens which is designed as a lens metallized on the back, wherein the convex side of the first lens forms an angle other than 90° with the normal of the modulator surface of the first tilting mirror matrix without possible foldings of the beam path.

A47. Projection system according to version A46, in which the metallized back of the second lens forms the aperture stop.

A projection system A48 with an illumination module, a first tilting mirror matrix, a second tilting mirror matrix and imaging optics which comprise a first lens and an imaging mirror and which image the first tilting mirror matrix onto the second tilting mirror matrix is furthermore provided, wherein every tilting mirror matrix has several switchable tilting mirrors each the tilting axes of which lie in a modulator surface and which can in each case be switched into a first and second tilting position, wherein a first beam-splitting module with a first deflecting surface is provided, via which the first tilting mirror matrix is illuminated with light such that the light strikes perpendicular to the modulator surface of the first tilting mirror matrix, wherein the light reflected by the tilting mirrors of the first tilting mirror matrix which are in the first tilting position is reflected on the first deflecting surface of the first beam-splitting module towards the imaging optics and this light is imaged by the imaging optics onto the second tilting mirror matrix, wherein a second beam-splitting module with a second deflecting surface is provided between the imaging optics and the second tilting mirror matrix, and the second deflecting surface directs the light onto the second tilting mirror matrix at such an angle that the light reflected by the tilting mirrors of the second tilting mirror matrix which are in the first tilting position runs perpendicular to the modulator surface of the second tilting mirror matrix.

Developments of the projection system A48, which is also called projection system according to version A48, are given below.

A49. Projection system according to version A48, in which each of the tilting mirror matrices is secured to one beam-splitting module each.

A50. Projection system according to version A48 or A49, in which both modulator surfaces lie in the same plane or in planes parallel to each other.

A51. Projection system according to one of versions A48-A50, in which one surface each, facing the imaging optics, of the two beam-splitting modules is cemented onto an optical surface of the first lens, in particular a flat optical surface of the first lens.

A compact design of the corresponding projection system can be ensured with the deflecting optics of the described projection systems. In particular, there is enough space for the necessary electronic control unit of the tilting mirror matrices, with the result that the electronic control units do not extend into the area of the imaging optics which is needed for the imaging.

Through the design of the imaging optics described herein, it is possible to minimize the imaging errors of the imaging optics while simultaneously reducing the number of elements of the imaging optics.

In particular, the imaging optics can have only the plano-convex lens and the lens metallized on the back.

The lens metallized on the back preferably has only spherical boundary surfaces.

With the design of the projection system according e.g. to claim 16 or version A33, the angles predetermined by the tilting positions are optimally exploited. In particular, the imaging optics are easier to adjust. A projection lens system arranged downstream of the second tilting mirror matrix can also be adjusted more easily, as the light reflected by the tilting mirrors which are in the first tilting position runs perpendicular to the modulator surface of the second tilting mirror matrix.

The imaging optics can be designed in particular as 1:1 imaging optics. However, they can also be designed as a enlarging or reducing imaging optics.

The projection systems according to the invention can each be designed in particular as a projector for applications in a planetarium such that the image to be projected is projected onto a curved projection surface. The curved projection surface can be part of a planetarium dome. In this design projection takes place usually in the dark, with the result that the achieved reduction in black level brings with it a clear improvement in the image.

The projection systems can furthermore be designed in each case as a projector for front projection or as a projector for rear projection. The projection surface can be a constituent of the projector.

The imaging optics and/or the deflecting optics can use a single material for the material through which the light passes. The lenses of the imaging optics and the deflecting prisms of the deflecting optics can thus be made from the same material.

The projection systems can furthermore have further parts or modules known to a person skilled in the art, in order that the desired image can be projected.

It is understood that the features named above and still to be explained below can be used not only in the given combinations, but also in other combinations or alone, without departing from the framework of the present invention.

BRIEF DESCRIPTION OF THE DRAWINGS

The invention is explained in further detail below by way of example using the attached drawings which also disclose features essential to the invention. There are shown in:

FIG. 8 is a perspective view of a modification of the projector in a representation according to FIG. 7.

DETAILED DESCRIPTION

Figure 1:
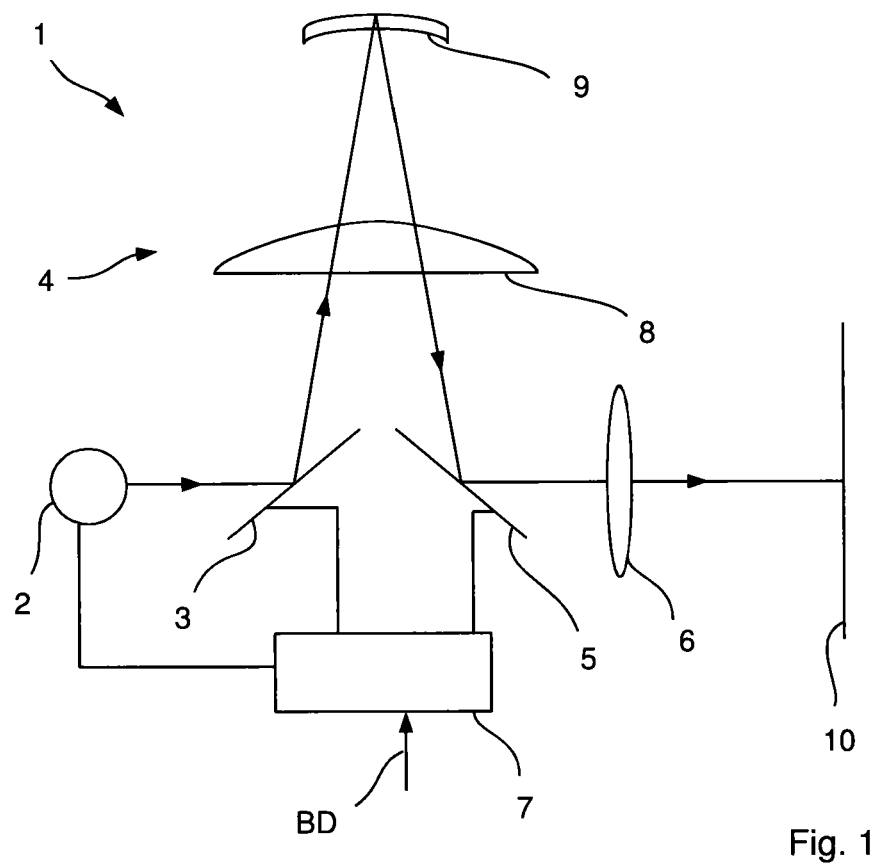
FIG. 1 is a schematic view of an embodiment of the projector according to the invention.

In the embodiment shown schematically in FIG. 1, the projector 1 according to the invention for projecting an image comprises a light source 2, an illumination modulator 3, imaging optics 4, an image modulator 5, a projection lens system 6 as well as a control unit 7.

The two modulators 3, 5 are each designed as a tilting mirror matrix having n×m tilting mirrors in columns and rows, wherein the tilting mirrors can, independently of one another, be brought into a first and into a second tilting position.

The imaging optics 4 are designed as 1:1 imaging optics with a first plano-convex lens 8 and a second lens 9 metallized on the back and image each tilting mirror of the illumination modulator 3 precisely onto a tilting mirror of the image modulator 5, with the result that precisely one tilting mirror (hereinafter also called image pixel) of the image modulator 5 is allocated to each tilting mirror (hereinafter also called illumination pixel) of the illumination modulator 3. Other allocations of image and illumination pixels are also possible. Thus e.g. a shift in the row direction can be brought about such that each image pixel is illuminated by two illumination pixels (half each).

The two modulators 3 and 5 are controlled by the control unit 7 based on fed-in image data BD such that the illumination modulator 3 which is struck by the light (e.g. white light) from the light source 2 is a 2-dimensionally modulated light source for the image modulator 5 with which the image to be projected is generated or modulated and then projected onto a projection surface 10 by means of the projection lens system 6.

The illumination modulator can be controlled such that only the light reflected by the tilting mirrors of the illumination modulator, which are allocated to a tilting mirror of the image modulator which is to generate an image spot that is not black in the image, is imaged onto the image modulator 5. It can thereby be achieved that image pixels of the image modulator which are to represent black image spots are not struck by light (as the allocated illumination pixels or the light reflected by these is not imaged on the image modulator). The advantageous result of this is that the black level (thus the undesired residual brightness of a black image spot in the image actually projected) can be clearly reduced.

Before the specific design, shown in FIGS. 3 to 5, of the imaging optics 4 as well as the arrangement of the two tilting mirror matrices 3 and 5 are described in more detail, it will first be explained in conjunction with the schematic representation of FIG. 2 how the light modulation is brought about with the two tilting mirror matrices 3 and 5.

Figure 2:
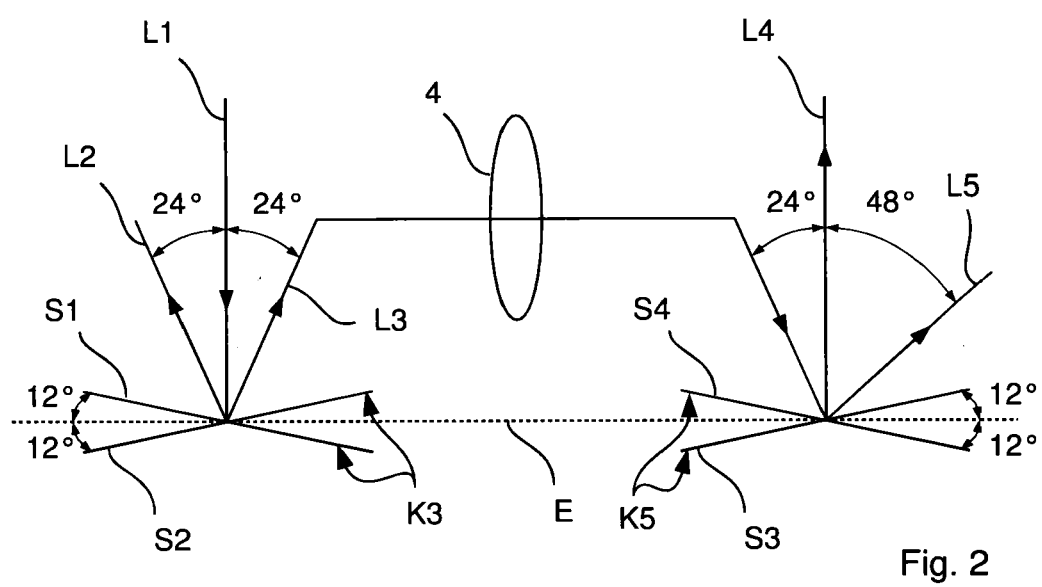
FIG. 2 is a schematic representation for explaining the light modulation with the two tilting mirror matrices 3, 5 of the projector 1 from FIG. 1.
Figure 3:
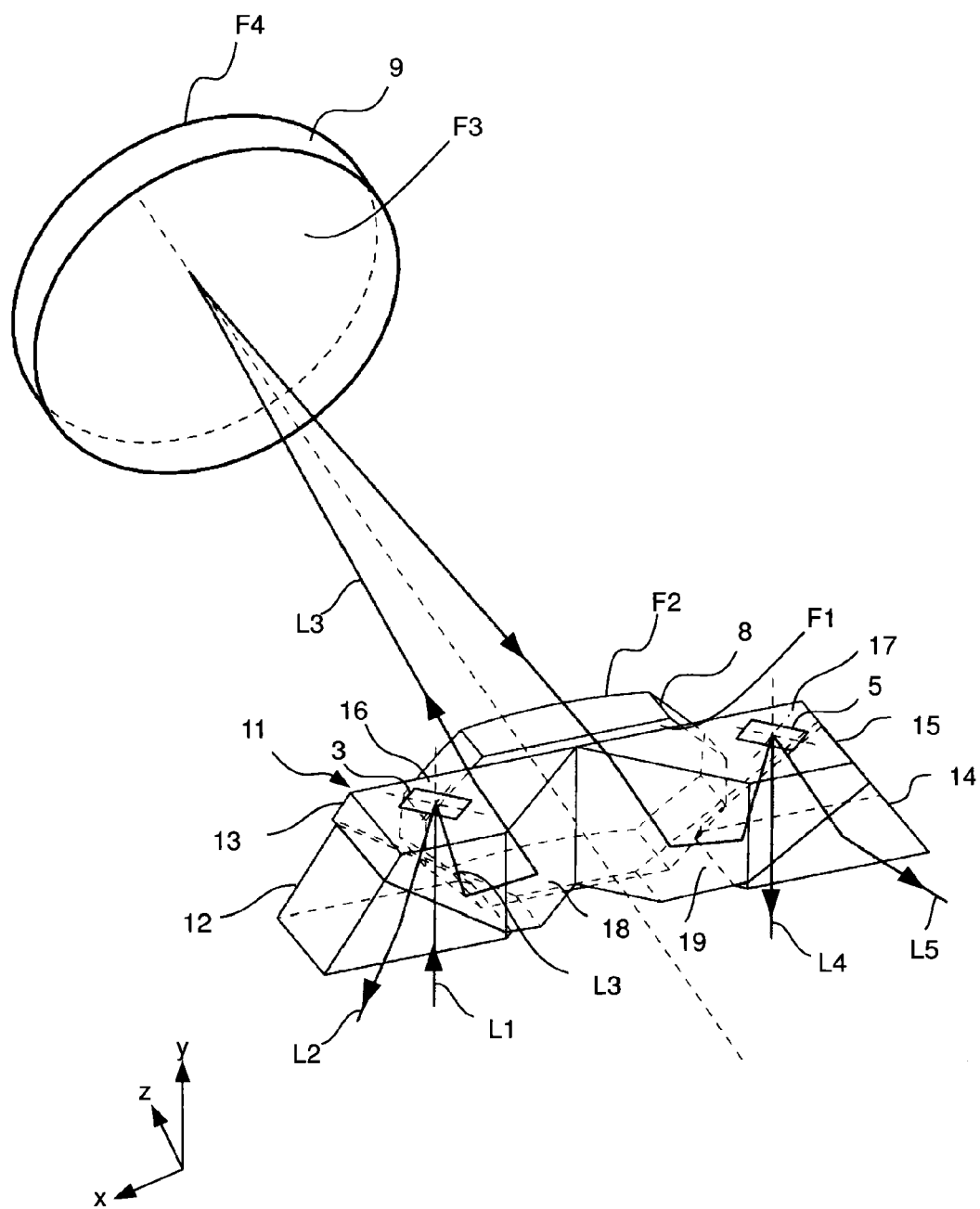
FIG. 3 is a perspective view of the imaging optics 4 of the projector 1 from FIG. 1.

In FIG. 2, in each case only a single tilting mirror K3, K5 in its two possible tilting positions is drawn to represent each tilting mirror matrix 3, 5. The tilting mirrors K3 and K5 are shown in a sectional representation which is chosen such that the respective tilting axis of the two tilting mirrors K3 and K5 runs perpendicular to the plane of the drawing. As the two modulators 3 and 5 lie in a common plane E, the tilting axes of the tilting mirrors K3 and K5 lie in this plane E, which is represented as a dotted line in the sectional representation from FIG. 2.

The tilting mirror K3 of the modulator 3 can be either in its first tilting position S1 or in a second tilting position S2. Both tilting positions are inclined by 12° relative to the plane E. In FIG. 2, both tilting positions S1 and S2 are drawn. Of course, the tilting mirror K3 can only ever be in one of the two tilting positions S1, S2 at one time. The same is true for the tilting mirror K5 of the image modulator 5. The tilting mirror K5 can be either in its first position S3 or in its second position S4.

During operation of the projector 1, the tilting mirror K3 is struck by light L1 from the light source 2 such that the light L1 strikes the tilting mirror K3 perpendicular to the plane E. When the tilting mirror K3 is in its second position S2, as the tilting mirror K3 is tilted by 12° anti-clockwise relative to the plane E, the light is reflected as a so-called off-light L2 at an angle of 24° to the direction of incidence of the light L1 onto a beam trap, not shown. This off-light L2 is not used to illuminate the image modulator 5.

However, when the tilting mirror K3 is in its first position S1, the light is reflected as a so-called on-light L3 at an angle of 24° relative to the direction of incidence of the light L1. As described in still more detail below, this on-light L3 is imaged by means of the imaging optics 4 onto the allocated tilting mirror K5 of the image modulator 5. The direction of incidence of the on-light L3 onto the tilting mirror K5 is chosen such that, when the tilting mirror K5 is in its first position S3, the reflected light L4 runs perpendicular to the plane E. For this, the light L3 impinging on the tilting mirror K5 is at an angle of 24° to the perpendicular on the plane E. In the first tilting position S3 of the tilting mirror K5, this leads to the desired reflection, with the result that the light can be projected by means of the projection lens system 6 onto the projection surface 10 as an on-light L4.

When the second tilting mirror K5 is in its second tilting position S4, the light is reflected as an off-light L5 at an angle of 48° relative to the perpendicular on the plane E. This off-light is conducted into a beam trap (not shown) and is not used in the image projection onto the projection surface 10.

In this way, the 2-dimensionally modulated light source can be provided by the first tilting mirror matrix 3, in which case at least all tilting mirrors of the illumination modulator 3 which are imaged onto a tilting mirror of the image modulator 5 which is to represent an image spot that is not black are brought into the first tilting position. By the image modulator 5, the illuminated tilting mirrors K5 can then be switched into their first and second tilting positions such that the desired brightness of the corresponding image spot is generated during the period T of a single image representation. The brightness can be set by the relationship of the time periods during which the tilting mirror K5 is in its first position and during which the tilting mirror K5 is in its second position. The two modulators are controlled by pulse-width modulated control data which the control unit 7 generates on the basis of the fed-in control data BD.

As can be seen from FIGS. 3 to 5, a beam-splitting module 11 (which is hereinafter also called deflecting optics) which separates the on-light L3, L4 reflected by the modulators 3, 5 from the off-light L2, L5 reflected by the modulators 3, 5 is arranged between the imaging optics 4, which comprises the plano-convex lens 8 and the lens 9 metallized on the back, and the two modulators 3, 5. For this, the beam-splitting module 11 comprises a first and second prism 12, 13 for the illumination modulator 3 as well as a third and fourth prism 14, 15 for the image modulator 5. The beam-splitting module 11 thus comprises a first beam-splitting unit and a second beam-splitting unit which each have at least one deflecting surface 18, 19.

One of the modulators 3, 5 is arranged in each case on the upper side 16, 17 of the second and fourth prisms 13, 15. The upper sides 16, 17 lie in the same plane such that the tilting mirrors or the tilting axes of the tilting mirrors of the two modulators 3, 5 lie in the common plane E. As the tilting axes of the tilting mirrors run diagonal to the rectangular area in which the tilting mirrors are arranged in rows and columns, the two modulators 3, 5 are arranged in the plane E rotated on the upper sides 16 and 17 such that the tilting axes of the tilting mirrors extend in the Z direction. Furthermore, the two modulators 3, 5 are arranged point-symmetrical to each other, wherein the point of symmetry is identified as SP in FIG. 4.

The prisms 12 and 13, which consist of the same material, are separated from each other by a thin air gap (approx. 3-6 μm), with the result that the on-light L3 from the illumination modulator 3 is reflected due to total internal reflection on the surface of the prism 13 bordering the air gap in the XY plane to the right side surface 18 of the prism 13 (the on-light L3 coming from the illumination modulator 3 and the on-light L3 reflected due to total internal reflection lie in the XY plane). The right side surface 18 is metallized and inclined by 45° relative to the on-light L3 impinging on it, with the result that, on the right side 18, a 90° deflection in the XZ plane in the direction of the imaging optics 4 takes place.

The off-light L2 from the illumination modulator 3, on the other hand, is not reflected on the surface of the prism 13 bordering the air gap, but passes through this, the air gap and the first prism 12 and is then collected by a beam trap, not shown. Thus, a separation of the on-light and the off-light is brought about by the two prisms 12 and 13 and the air gap provided between them.

The third and fourth prisms 14, 15 are designed substantially mirror-symmetrical relative to the YZ plane to the first and second prisms 12, 13. Here too, a thin air gap is again present between the two prisms 14, 15. As can be seen from the course of the beam in FIG. 3, the on-light L3 coming from the imaging optics 4 is reflected by 90° in the XZ plane on the left metallized side surface 19 of the fourth prism 15 and then reflected upwards onto the image modulator 5 due to total internal reflection on the boundary surface of the fourth prism 15 to the air gap in the XY plane such that the on-light L3 strikes the image modulator 5 at an angle of 24° relative to the normal on the plane E. The on-light from the image modulator 5 runs perpendicular to the plane E in the Y direction through the two prisms 15 and 14 and the air gap lying between them and is then projected onto the projection surface 10 by means of the projection lens system 6 not shown in FIGS. 3 to 5. The off-light L5, on the other hand, is reflected at an angle of 48° relative to the perpendicular on the plane E of the modulator 5 and is collected by a beam trap, not shown, after passing through the prisms 15 and 14 and air gap.

A very compact arrangement of the two modulators 3, 5 is possible by means of the beam-splitting module 11. The splitting of the beam into on- and off-light can also be easily accomplished, with the result that there is still sufficient space for e.g. the projection lens system 6.

The beam-splitting module 11 or at least the prisms 12 and 13, together with the light source 2, ensure that the first modulator 3 is illuminated perpendicularly with the light L1 and can therefore also be called illumination module.

Figure 6:
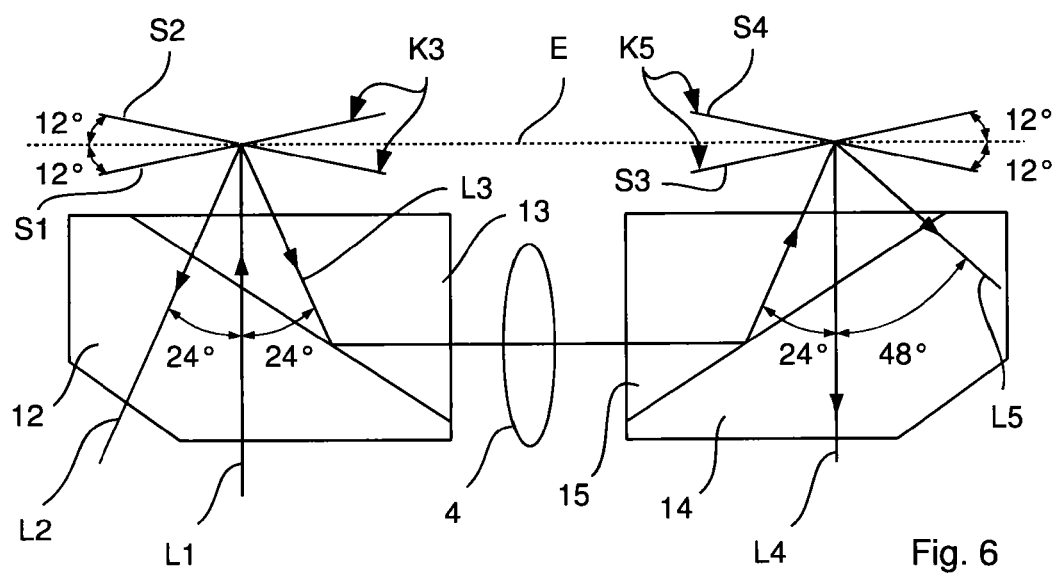
FIG. 6 is a schematic representation for explaining the light modulation with the two tilting mirror matrices 3, 5 of the projector 1 from FIGS. 3 to 5.

The splitting of the beam into on- and off-light due to the air gap between the prisms 12 and 13 as well as between the prisms 14 and 15 is to be illustrated again using the schematic representation in FIG. 6, which essentially corresponds to the representation from FIG. 2, as the prisms 12-15 are additionally drawn schematically in FIG. 6. Identical elements are given the same reference numbers, wherein the tilting mirrors K3 and K5 are represented above the prisms 12-15 in FIG. 6, as is also the case in FIG. 3.

As can be seen from the representation in FIG. 6, only the on-light L3 is deflected towards the imaging optics 4 by total internal reflection. The off-light L2, on the other hand, passes through the surface of the prism 13 bordering the air gap, through the air gap and through the prism 12.

The on-light L3 is directed onto the surface of the prism 15 bordering the air gap by means of the imaging optics 4 such that the light strikes the second tilting mirror matrix or the second image modulator 5 by total internal reflection. The on-light L4, which is reflected by the second modulator 5, then runs perpendicular to the plane E in the Y direction through the broad prisms 15 and 14 as well as the gap lying between them, whereas the off-light L5 is reflected by the modulator at the angle of 48° relative to the perpendicular on the plane E and, after passing through the prisms 15 and 14 and the air gap present between them, strikes a beam trap, not shown.

The imaging optics 4 are designed such that they do not limit the maximum possible light conductance of the tilting mirror matrices 3, 5. The numerical aperture (sine of the maximum opening angle of the beam bundle) is in this case 0.2 and the angle between the main beams of the imaging bundle and the modulator normals is 24°. The imaging optics 4 are designed for a usable wavelength range of from 400 to 700 nm.

Figure 4:
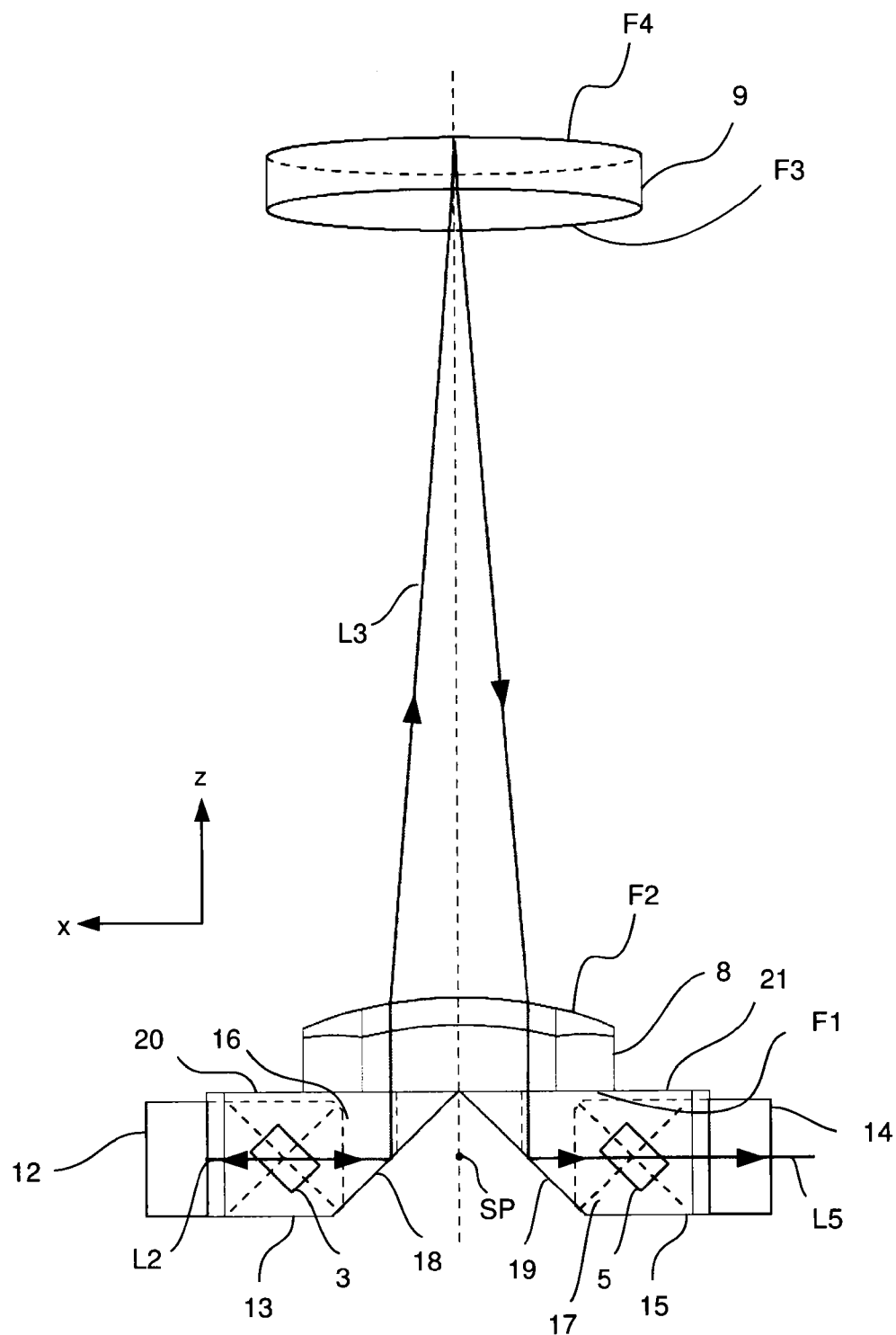
FIG. 4 is a top view of the imaging optics 4 of the projector 1 from FIG. 1.
Figure 5:
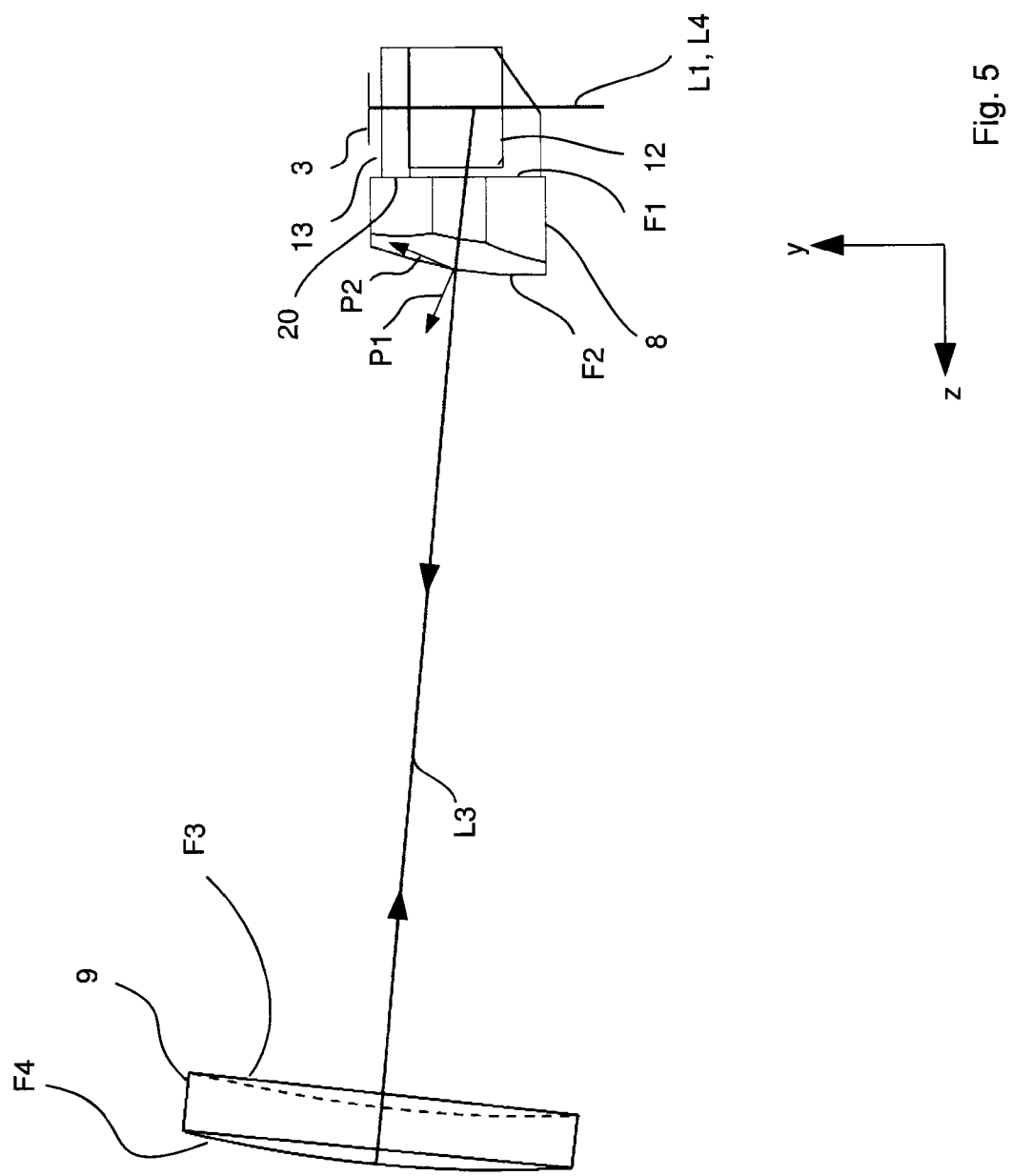
FIG. 5 is a side view of the imaging optics of the projector 1 from FIG. 1.

The plano-convex lens 8 has a flat surface F1 which is cemented to the likewise flat back surfaces 20, 21 of the prisms 13, 15, as can best be seen in FIG. 4, and a convex surface F2. The convex surface F2 is a non-spherical surface which has as single symmetry a mirror symmetry to the YZ plane and which can be described according to the following Formula 1

$$z = \frac{(x^2 + y^2)/R}{1 + \sqrt{1 - (1+k) \cdot \frac{(x^2 + y^2)}{R^2}}} + \sum_{m,n=1}^{\infty} Cm, n \frac{1}{N_{Radius}^{n+m}} x^m y^n \qquad (1)$$

Here, x, y and z denote the three Cartesian coordinates of a point lying on the surface F2 in the local surface-related coordinate system. The local surface-related coordinate system of the surface F2 and thus the surface F2 is rotated 22.4° clockwise (in FIG. 5) about the X axis of the local surface-related coordinate system of the back surfaces 20, 21, which is drawn in FIGS. 3-5. R, k and the coefficients $C_{m,n}$ are given in the following Table 1. To simplify the representation, the coefficients $C_{m,n}$ are called C(m,n) in Table 1.

TABLE 1

| | F2 |
|---|---|
| k | −8.442E−01 |
| C (0, 1) | 1.866E−04 |
| C (2, 0) | 1.637E−03 |
| C (0, 2) | 1.758E−03 |
| C (2, 1) | −1.761E−06 |
| C (0, 3) | 1.863E−05 |
| C (4, 0) | −1.958E−07 |
| C (2, 2) | −6.571E−07 |
| C (0, 4) | 1.625E−06 |
| C (4, 1) | 7.519E−10 |
| C (2, 3) | −1.323E−08 |
| C (0, 5) | 1.103E−07 |
| C (6, 0) | −4.091E−11 |
| C (4, 2) | 2.570E−11 |
| C (2, 4) | −4.287E−10 |
| C (0, 5) | 3.789E−09 |
| C (6, 1) | 8.301E−13 |
| C (4, 3) | 5.581E−12 |
| C (2, 5) | −4.830E−12 |
| C (0, 7) | 6.987E−11 |
| C (8, 0) | 2.748E−15 |
| C (6, 2) | 3.199E−14 |
| C (4, 4) | 5.573E−14 |
| C (2, 6) | −3.490E−14 |
| C (0, 8) | 5.242E−13 |
| $N_{Radius}$ | 1.532E+00 |
| R | −110.856 |

A sufficiently good correction of all image errors is normally achieved if the polynomial development of the surface F2 contains terms up to the maximum order n+m≦8, as in the present embodiment example, wherein because of the mirror symmetry of the imaging to the YZ plane only those terms that belong to an even power of the X coordinates do not equal zero. Of course, it is also possible to use terms up to the order n+m≦10.

The glass path of the on-light L3 from the upper side 16 of the second prism 13 or to the surface F2 is exactly as long as the glass path of the on-light L3 reflected at the mirror surface F4 from the surface F2 up to the upper side 17 of the fourth prism 15, namely 102.8 mm.

The second lens 9 is designed as an off-axis section cut from a lens with a first and second spherical boundary surface, wherein the surface F3 is a section cut from the first spherical boundary surface and the surface F4 is a section cut from the second spherical boundary surface. The two spherical boundary surfaces have the same radius of curvature of −375.75 mm and are spaced 17.5 mm apart in axial direction. The axial direction is, in this case, the Z direction of the local coordinate system of the surface F2 before its rotation by 22.4°. The axial distance between the local coordinate origins of the surfaces F2 and F3 is 252.61 mm.

The aperture stop of the imaging optics 4 is formed by the optically used area of the mirror surface F4 of the second lens 9. The diameter of the mirror surface F4 (=aperture stop) is 108 mm and the centre of the mirror surface F4 is offset and tilted relative to the local coordinate origin of the second spherical boundary surface.

The edge of the optical used area of the mirror surface F4 here lies in a plane that can therefore also be called aperture stop plane. The aperture stop plane forms an angle other than 90° with the normal of the plane in which the tilting axes of the tilting mirror of the first modulator 3 lie without the foldings of the beam path by the prism 13.

As an off-axis section cut from the lens determined by the two spherical boundary surfaces forms the glass lens 9, the glass lens 9 has a slightly tapered design.

The two lenses 8, 9 and the prisms 12 to 15 are formed from the same material. Here, the material BK7 is used with an Abbe coefficient of 64.17 and a refractive index of 1.5168 at 587.6 nm.

To reach the centre of the surface F3 from the originating point of the local coordinate system of the surface F2, it is necessary to shift the originating point along the Z direction (drawn schematically as arrow P1 in FIG. 5) of the local coordinate system of the surface F2 by 238.17 mm and then by −103.16 mm along the Y direction (indicated as arrow P2 in FIG. 5) of the local coordinate system of the surface F2. There is then also a tilting by 15.94° (thus anti-clockwise in FIG. 5) about the X axis of the local coordinate system of the surface F2.

In the same way, the position of the centre of the surface F4 relative to the local coordinate system of the surface F2 can be given. There is a shift of 254.26 mm in the Z direction, of −107.99 mm in the Y direction, followed by a tilting by 16.7° about the X axis of the local coordinate system of the surface F2.

Through this design of the imaging optics, the mirror surface F4 and thus the aperture stop of the imaging optics 4 is tilted relative to the modulator surface (=surface in which the tilting axes of the tilting mirrors lie) of the tilting mirror matrix 3 when the beam path is unfolded (thus without the two foldings of the beam path in the deflecting optics 11). The Z axis of the local coordinate system of the surface F4 is thus not parallel to the normal of the modulator surface of the first tilting mirror matrix 3, but forms an angle of between 0 and 90° with the normal. Furthermore, the surface F4 is decentred relative to the first tilting mirror matrix in the YZ plane. Very compact imaging optics with excellent imaging properties can thus be achieved. The distortion of the imaging optics 4 on each spot of the second tilting mirror matrix 5 is thus less than 3 μm and therefore less than a quarter of the width of the tilting mirrors of the tilting mirror matrix 5.

The tilting of the aperture stop can also be described such that the modulator plane E in the unfolded state is not parallel to the plane which is covered by the X and Y axes of the local coordinate system of the surface F4, wherein the centre of the surface F4 is the originating point of the local coordinate system. Thus, with the imaging optics according to the invention, the first tilting mirror matrix 3 can be imaged onto the second tilting mirror matrix 4, which are arranged in the same plane, at a beam path angle (angle between the normal on the modulator surface and the main beams of the bundles of light used for the intermediate imaging) with a very high image quality. The beam path angle can correspond to the maximum tilting angle of the tilting mirrors.

As the extents of the surfaces F2-F4 are determined from the predetermined dimensions of the image field (modulator surfaces), the numerical aperture and the design data of the optical elements, an artificial vignetting of the imaging optics can be avoided.

The tilted aperture stop or the tilted pupils of the imaging optics 4 thus advantageously lead to imaging optics 4 with excellent imaging properties.

Figure 7:
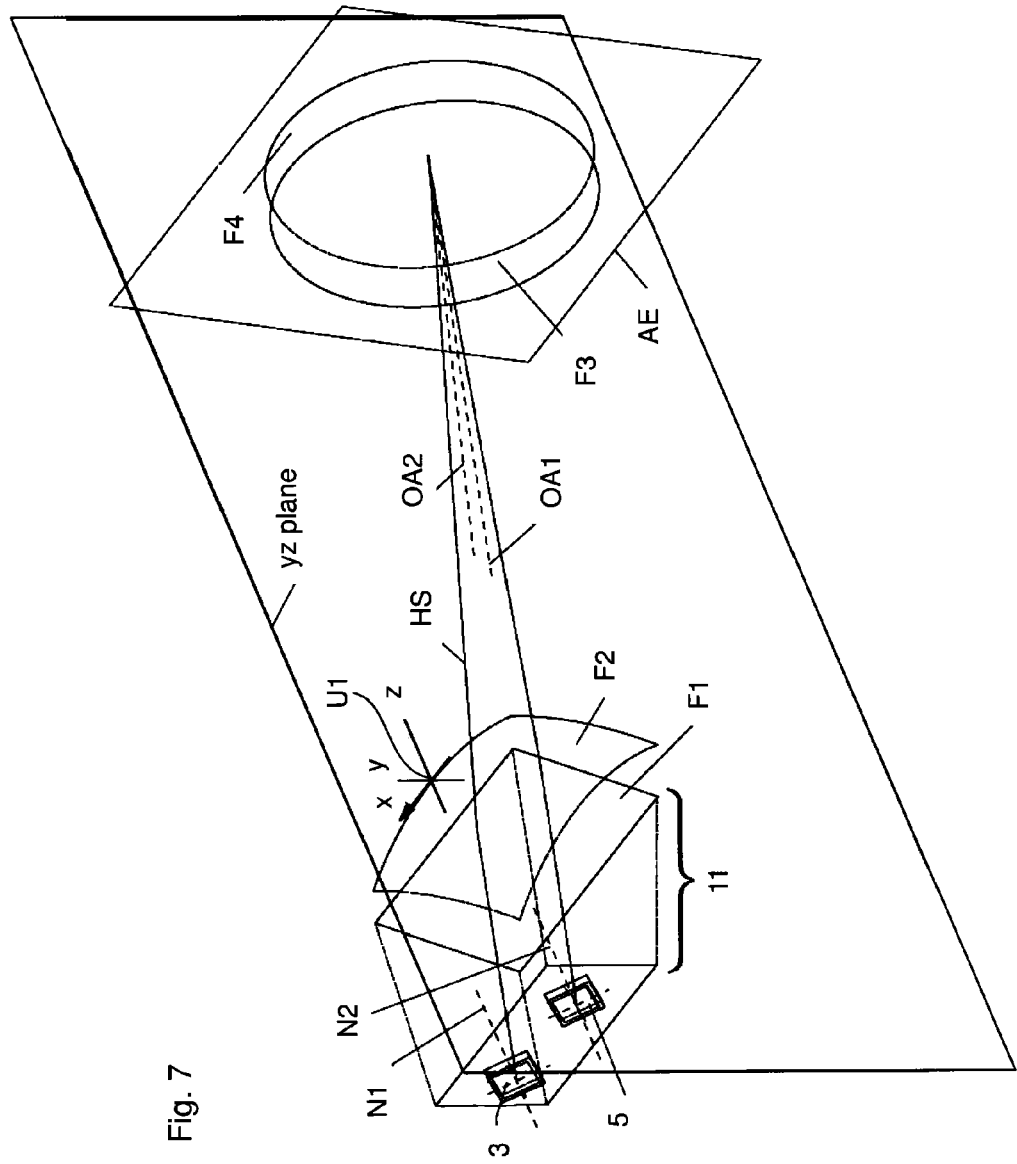
FIG. 7 is a perspective view of the projector according to FIGS. 1 to 6, wherein only the glass path through which the on-light is to pass is represented as a block for the beam-splitting module.

In FIG. 7, a perspective representation of the projector 1 according to FIGS. 1 to 6 is shown in which only the glass path (without the foldings of the beam path carried out) is drawn as a block through which the on-light L3 passes for the beam-splitting module 11.

In FIG. 7, the normals N1 and N2 are drawn for the modulator surfaces in which in each case the tilting axes of the tilting mirrors of the two modulators 3, 5 lie. Furthermore, the coordinate origin U1 of the free-form surface F2 is represented and the optical axis OA1 of the surface F3 and the optical axis OA2 of the reflective surface F4 are marked. It can easily be seen from FIG. 7 that the aperture stop (optically used area of the mirror surface F4) or the aperture stop plane AE in which the edge of the optically used area of the mirror surface F4 lies forms an angle other than 90° relative to the normal N1 of the modulator surface of the first tilting mirror matrix 3.

Furthermore, the YZ plane to which the imaging optics 4 are symmetrical is also drawn in FIG. 7.

No optical axis is drawn for the free-form surface F2, as a free-form surface in the conventional sense has no optical axis.

Finally, the main beam HS of the on-light L3 which starts from the central field point of the modulator 3 is also drawn in FIG. 7.

In FIG. 8, a variant of the projector 1 according to the invention is shown in the same way as in FIG. 6, wherein identical or similar elements are given the same reference numbers. Unlike the projector 1 according to FIGS. 1-7, in the case of the projector 1 according to FIG. 8 the imaging optics 4 do not have lenses metallized on the back, but only a curved mirror surface F5 (imaging mirror) with an optical axis OA3. Here too, the angle between the aperture stop (imaging mirror F5) and the normal N1 does not equal 90°.

In the description thus far, it has been assumed that the illumination modulator 3 is struck by white light. However, it is also possible that the light source 2 emits coloured light. In particular, it can emit time-sequentially differently coloured light, such as e.g. red, green and blue light. A multicoloured image can then be generated in the manner known to a person skilled in the art through the time-sequential representation of red, green and blue colour subframes. The colour change only has to be carried out quickly enough for an observer to no longer be able to separate the colour subframes projected one after another in time, with the result that the observer can discern only the superimposition and thus the multicoloured image.

The time-sequential generation of the differently coloured illumination light can be carried out in the usual manner, for example by means of a colour wheel (not drawn) between the light source 2 and the illumination modulator 3.

Of course, it is also possible to provide, instead of only one illumination modulator, three illumination modulators 3 which are struck simultaneously by red, green or blue light. The red, green and blue on-light of the three modulators is then superimposed and the superimposed on-light is imaged in selected colours onto three image modulators 5 by means of the imaging optics 4. The image modulators modulate the respective colour subframe which is in turn superimposed and then projected onto the projection surface 10 by means of the imaging optics 6.

The superimposition and colour separation can be carried out by means of dichroic layers. This embodiment with six modulators is, of course, clearly more expensive than the embodiment described in connection with FIGS. 1 to 7. However, a brighter colour image can be generated with such an embodiment.

The invention claimed is:

1. A projection system, comprising:
   a first tilting mirror matrix;
   a second tilting mirror matrix;
   imaging optics that image the first tilting mirror matrix onto the second tilting mirror matrix;
   wherein each tilting mirror matrix includes a plurality of tilting mirrors, each tilting mirror having a tilting axis which lies in a modulator surface plane;
   wherein the imaging optics comprise a first lens and an imaging mirror and wherein the imaging mirror forms an aperture stop of the imaging optics and further wherein a plane of the aperture stop forms an angle other than ninety degrees with a normal of the modulator surface of the first tilting mirror matrix without taking into account possible foldings of the beam path;
   wherein the modulator surface plane of the first tilting mirror matrix is arranged in a modulator plane and the modulator surface plane of the second tilting mirror matrix is arranged in the modulator plane or a plane parallel to the modulator plane and a deflecting optics is arranged between the first tilting mirror matrix and the second tilting mirror matrix and a beam path from the deflecting optics leads to the imaging optics and then returns to the deflecting optics, and wherein said deflecting optics folds the beam path between the imaging optics and each of the first and second tilting mirror matrix at least once.

2. The projection system according to claim 1, wherein the aperture stop is arranged offset to the normal passing through a center of the modulator surface plane of the first tilting mirror matrix without taking into account possible foldings of the beam path.

3. The projection system according to claim 1, wherein the first lens comprises a plano-convex lens and the imaging mirror comprises a second lens metalized on a back thereof, wherein a convex side of the first lens forms an angle other than 90° with the normal of the modulator surface of the first tilting mirror matrix without taking into account possible foldings of the beam path.

4. The projection system according to claim 3, wherein the convex side of the first lens is designed as an aspherical surface which has precisely one plane of mirror symmetry and is tilted relative to the flat side of the first lens.

5. The projection system according to claim 4, wherein the imaging optics have precisely one plane of mirror symmetry.

6. The projection system according to claim 5, wherein the modulator surfaces planes of the two tilting mirror matrices are arranged symmetrical to the plane of mirror symmetry.

7. The projection system according to claim 1, wherein the first lens comprises a plano-convex lens and the imaging mirror comprises a second lens metalized on the back, wherein the convex side of the first lens is designed as an aspherical surface which has precisely one plane of mirror symmetry and is tilted relative to the flat side of the first lens.

8. The projection system according to claim 1, wherein the deflecting optics causing at least one folding of the beam path between the first tilting mirror matrix and the imaging optics by total internal reflection.

9. The projection system according to claim 1, wherein the deflecting optics causes the at least one folding of the beam path between the second tilting mirror matrix and the imaging optics by total internal reflection.

10. The projection system according to claim 1, wherein the deflecting optics folds the beam path between the imaging optics and each of the first and second tilting mirror matrix twice.

11. The projection system according to claim 1, wherein the deflecting optics is symmetrical to a center plane perpendicular to the modulator plane.

12. The projection system according to claim 11, wherein the modulator surfaces of each of the first and second tilting mirror matrix are arranged symmetrical to the center plane.

13. The projection system according to claim 11, wherein the imaging optics are symmetrical to the center plane.

14. The projection system according to claim 1, wherein the imaging optics comprise a first lens which comprises a plano-convex lens having a convex side and a flat side and a second lens which comprises a lens metalized on a back thereof, wherein the flat side of the first lens is cemented to the deflecting optics.

15. The projection system according to claim 1,
wherein each of the first and second tilting mirror matrix includes tilting mirrors that can be switched between a first and a second tilting position,
the projection system further comprising an illumination module that illuminates the first tilting mirror matrix with light such that the light strikes perpendicular to the modulator surface plane of the first tilting mirror matrix, and
wherein the imaging optics image light reflected by the tilting mirrors of the first tilting mirror matrix which are in the first tilting position onto the second tilting mirror matrix at such an angle that the light reflected by the tilting mirrors of the second tilting mirror matrix which are in the first tilting position runs perpendicular to the modulator surface plane of the second tilting mirror matrix.

16. A projection system, comprising:
a first tilting mirror matrix;
a second tilting mirror matrix;
imaging optics that image the first tilting mirror matrix onto the second tilting mirror matrix;
wherein each tilting mirror matrix includes a plurality of tilting mirrors, each tilting mirror having a tilting axis which lies in a modulator surface plane;
wherein the imaging optics comprise a first lens and an imaging mirror and wherein the imaging mirror forms an aperture stop of the imaging optics and further wherein a plane of the aperture stop forms an angle other than ninety degrees with a normal of the modulator surface of the first tilting mirror matrix without taking into account possible foldings of the beam path;
wherein each of the first and second tilting mirror matrix includes tilting mirrors that can be switched between a first and a second tilting position,
the projection system further comprising an illumination module that illuminates the first tilting mirror matrix with light such that the light strikes perpendicular to the modulator surface plane of the first tilting mirror matrix, and
wherein the imaging optics image light reflected by the tilting mirrors of the first tilting mirror matrix which are in the first tilting position onto the second tilting mirror matrix at such an angle that the light reflected by the tilting mirrors of the second tilting mirror matrix which are in the first tilting position runs perpendicular to the modulator surface plane of the second tilting mirror matrix.

* * * * *